United States Patent

Arweiler et al.

[11] Patent Number: 5,517,522
[45] Date of Patent: May 14, 1996

[54] PROCESS FOR DETECTING THE NATURE OF DATA-FALSIFYING INTERFERENCE

[75] Inventors: Hans-Werner Arweiler; Andreas Wolf, both of Berlin, Germany

[73] Assignee: Siemens Aktiengesellschaft, München, Germany

[21] Appl. No.: 167,979

[22] PCT Filed: May 12, 1992

[86] PCT No.: PCT/DE92/00391

§ 371 Date: Feb. 14, 1994

§ 102(e) Date: Feb. 14, 1994

[87] PCT Pub. No.: WO93/00758

PCT Pub. Date: Jan. 7, 1993

[30] Foreign Application Priority Data

Jun. 26, 1991 [DE] Germany ............................. 41 21 481.1

[51] Int. Cl.⁶ ............................................... H04B 3/46
[52] U.S. Cl. ......................... 375/224; 375/209; 375/340; 371/5.1; 370/17; 364/554
[58] Field of Search ................................. 375/10, 94, 96, 375/99, 208, 209, 213, 224–227, 346; 364/552, 554; 371/5.1, 16.5, 64; 370/13, 17

[56] References Cited

U.S. PATENT DOCUMENTS

| 5,048,015 | 9/1991 | Zilberfarb | 375/10 |
| 5,144,642 | 9/1992 | Weinberg et al. | 375/10 |
| 5,260,972 | 11/1993 | Wang | 375/96 |

FOREIGN PATENT DOCUMENTS

| 094902 | 11/1983 | European Pat. Off. |
| 3004767 | 5/1981 | Germany . |

OTHER PUBLICATIONS

NTZ, vol. 44, No. 8, Aug. 1991, Berlin, DE; pp. 548–557; Wolf et al.: "Bitfehler–strukturanalyse in der Breitband–ISDN–Messtechnik".
Telcom Report, vol. 14, No. 2, Mar. 1991, Munchen, DE; pp. 104–107: Wolf; "Messprazision Auf Breitem Band".
Electronics Letters, vol. 26, No. 6 Mar. 1990, Stevenage, GB; pp. 363–363; Butler et al: "Correlation of Interference and Bit Error Activity in a Digital Transmission System".
U.S. Ser. No. 07/941,090 based on International Application PCT/DE91/00323.

Primary Examiner—Stephen Chin
Assistant Examiner—Amanda T. Le
Attorney, Agent, or Firm—Kenyon & Kenyon

[57] ABSTRACT

Test data are inserted on the data source side into a data stream (DS) transmitted to a data receiver (5) from a data source (1) via at least one transmission section (4). A bit error function (e(n)) is obtained from the test data received. The bit error function (e(n)) is evaluated in a part by part manner to discover its periodicity, the length of the partial section evaluated at the same time being measured in such a way that it contains a plurality of bit errors (BF). The bit error function (e(n) or err(n)) is subjected to auto-correlation. The maxima (M, M1, . . . Mi) of the auto-correlation functions (AKF(m)) thus obtained are used to determine the nature of the interference (10, 11) with reference to its stochastic or deterministic nature.

14 Claims, 4 Drawing Sheets

PROCESS FOR DETECTING THE NATURE OF DATA-FALSIFYING INTERFERENCE

BACKGROUND OF THE INVENTION

In modern transmission systems, such as the ISDN (Integrated Services Digital Network) system or the wide-band ISDN (B-ISDN), to transmit data streams, the transmission properties of established transmission path must be checked for the occurrence of bit errors. Bit errors caused by external interference effects acting on the transmission path corrupt the digital data stream originally sent out and, thus, interfere with information transmission.

The object of the present invention is to provide a process for determining the nature of an interference that causes bit errors with regard to its stochastic or deterministic character. When the bit-error type is known, the origin and/or the cause of the bit errors can be searched for efficiently.

SUMMARY OF THE INVENTION

This objective is solved by the present invention which sets forth a process for determining the nature of a data-corrupting interference that causes bit errors in a data stream which is sent from a data source and which is fed via at least one transmission path to a data receiver. In this process, test data are sent out from the data source, and a bit-error function is derived from the bit errors that are recognized in the received test data. To check the periodicity of the bit-error function, the received data stream is subjected, section by section, to an autocorrelation. The length of the autocorrelated section, at any one time, is rated to contain a plurality, preferably at least 100 bit errors, that have occurred. Whether a stochastic or deterministic interference exists is determined from the configuration and number of the maxima of the thus derived autocorrelation function. In particular, if the autocorrelation function exhibits a significant maximum without further pronounced maxima, a stochastic interference is inferred while if the autocorrelation function exhibits several maxima distributed equidistant, a deterministic interference is inferred.

By comparing the received test data and the test data that, in some instances, has been corrupted by bit errors to the original test data, a bit-error function is derived that is autocorrelated section by section. The length of the evaluated section is rated to contain a plurality of bit errors when bit errors occur, so that the autocorrelation function gives a clear indication of periodically or stochastically occurring bit errors. Thus, the method of the present invention is based on the realization that when a long enough section of the bit-error function is considered, a reliable statement can be made about the stochastic or deterministic character of the bit errors and, thus, of the interference.

Stochastic bit errors indicate noise effects, for example. Therefore, when stochastic bit errors occur, transmitters contained in the transmission path, receivers, amplifiers, etc. will be suspected as causing interference and can be checked accordingly. A deterministic character of the bit errors indicates, for example, periodic influences (such as system hum). An important advantage of the process according to the present invention is that very distinct and, thus, clear measuring results are obtained with relatively little expenditure. Further, these measuring results can be evaluated quite easily.

A process in which the transmission properties are monitored by means of correlation functions in the broad-band network B-ISDN in the case of the ATM (asynchronous transfer mode) is described in the periodical "Telcom Report" 14 (1991) issue 2, pp 104–107. However, in this process, test data coded on the transmission side with the aid of $2^5$-m-sequences are transformed on the receiving side in that the cross-correlation function is applied in the decoder, while information about the applied coding method is used. Conclusions about the number of bit errors can be drawn from the level of the main maximum of the particular cross-correlation function. However, details of the character (stochastic or deterministic) of the interference causing the bit errors cannot be obtained.

In one advantageous further development of the method according to the present invention, the bit-error function is subdivided before it undergoes autocorrelation, section by section, into classes having a defined class length. The classified bit-error function is derived, for example, by summing the bit errors recognized within the class length (defined number of bits) and by holding the sum until the beginning of the next class. In this manner, the data set to be processed is substantially reduced with respect to the bit-error function and, consequently, the speed required of the subsequent evaluation processes is reduced.

In another advantageous further development of the process according to the present invention, the bit-error function or the classified bit-error function is subjected, in addition, to a Fourier-, Laplace-, or Z-transformation. This step is particularly advantageous when it is ascertained that the interference has a deterministic character. With the Fourier-, Laplace- or Z-transformation, in some instances, a deterministic, periodic interference that the period or rather the frequency of the interference is determined. This development of the present invention permits further conclusions to be drawn about the cause or source of the bit error. Thus, given such a frequency of 100 Hz (due to the rectification effect), a system hum can be inferred as the cause of the errors. Thus, those elements of the transmission path which can be considered as possible causes of the bit errors, are narrowed further.

In the B-ISDN transmission systems mentioned at the outset, the data stream consists of successive data cells. Each data cell has a cell head and a useful cell field. The data stream arrives at the data receiver via at least one intermediate path designed as a switching station and linked to the transmission path. For data security and to enhance the transmission quality of the transmission path, the data stream is scrambled in accordance with a specified instruction by a known period length and, after emerging from the transmission path, is descrambled in accordance with a corresponding instruction. In a refinement of the process according to the present invention, which is particularly advantageous in light of this transmission system, the test data are written into test cells sent on the side of the data source and the bit-error function is derived from the received test cells. The length of the section of the bit-error function that is autocorrelated at any one time is selected to be longer, by at least one, and preferably two decades, than the known period length. Based on the characteristics of the scramblers or descramblers used, it is especially advantageous to evaluate a section of the bit-error function which is preferably at least two decades longer than the known period length in accordance with the specified instruction.

Injecting the test data or test cells into the data stream in accordance with the present invention can be realized in the case of an isolated transmission system by having the data stream contain exclusively test data in a predetermined time sequence. However, according to another advantageous further development of the process according to the present invention, the test data or test cells can also be inserted, at the data source, into a data stream containing useful information during the operation of the transmission system since it should be assumed that the test data are subjected to the same external, bit-error-causing interference effects as the useful data. This variant advantageously permits the transmission system to continue operating normally during the test. When testing a B-ISDN system, it is particularly advantageous to have the test cells replace existing blank cells of the useful-data stream.

According to yet another advantageous further development of the process of the present invention, the maxima of the autocorrelation function are evaluated to determine a bit-error rate.

DETAILED DESCRIPTION

Figure 1:
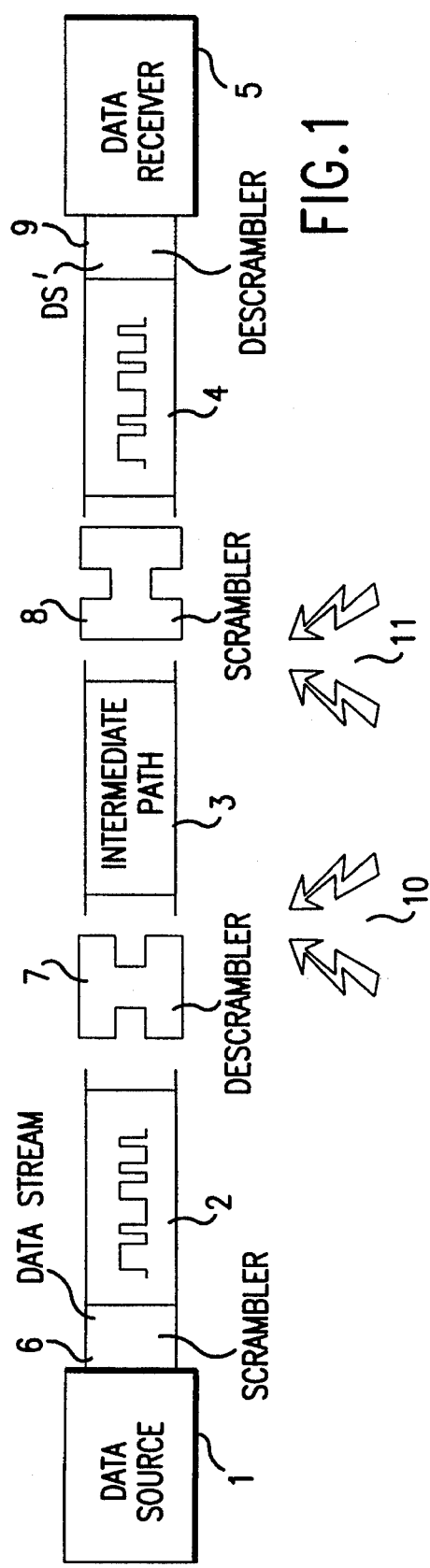
FIG. 1 is a schematic which illustrates the structure of a transmission system that can be tested using the process according to the present invention.

FIG. 1 shows the fundamental structure of a transmission system, for example of a B-ISDN system. A data source 1 transmits a data stream DS via a transmission path 2, an intermediate path 3 (designed as a switching station), and an additional transmission path 4 to a data receiver 5. At the data source, the data stream DS is scrambled in a scrambler 6 to encrypt it and to avoid a high level of same components in the data stream to be transmitted. The data stream DS is then descrambled before entering into the intermediate path 3 by a descrambler 7. After emerging from the intermediate path 3, the data stream DS is again scrambled in another scrambler 8 before entering into the additional transmission path 4. Finally, the data stream DS is descrambled by a descrambler 9 on the receiver side. Stochastic (random) interferences 10 acting on the transmission paths 2 and 4 or the intermediate path 3 and deterministic (regular) interferences 11 are indicated by arrows and lead to a corrupted data stream DS'. It is assumed that a connection (channel-1) has already been set up between the data source 1 and the data receiver 5 by the switching exchange 3. In the same way, the switching exchange 3 can simultaneously set up additional connections (channels) between other data sources and data receivers (not shown).

Figure 2:
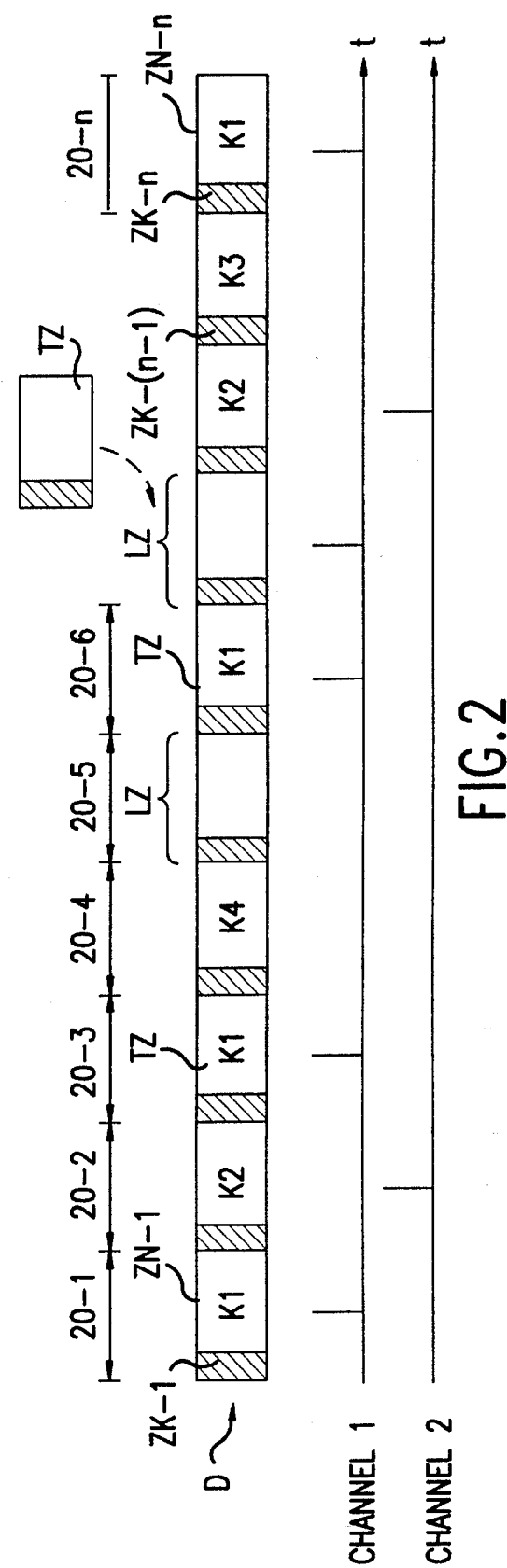
FIG. 2 illustrates a data stream having a cell-type structure in the transmission system.

FIG. 2 depicts a data stream D flowing through the switching exchange 3. The data stream D includes a plurality of data cells 20-1 . . . 20-n. Each data cell, for instance 20-1, includes a cell head ZK-1 and a useful cell field ZN-1. Besides the data cells 20-1, 20-3, 20-6, and 20-n assigned to the channel-1 between the data source 1 and the data receiver 5 (thus forming the data stream DS according to FIG. 1), additional data cells assigned to other channels are contained in the data stream D. Furthermore, the data stream D contains blank cells LZ which different data-transmission rates to be compensated. The data stream DS is either comprised only of test cells TZ (for example, test cells 20-3 and 2-6) or of test cells TZ inserted in blank cells LZ (FIG. 2) and, moreover, of useful cells (for instance 20-1) and blank cells.

Figure 3:
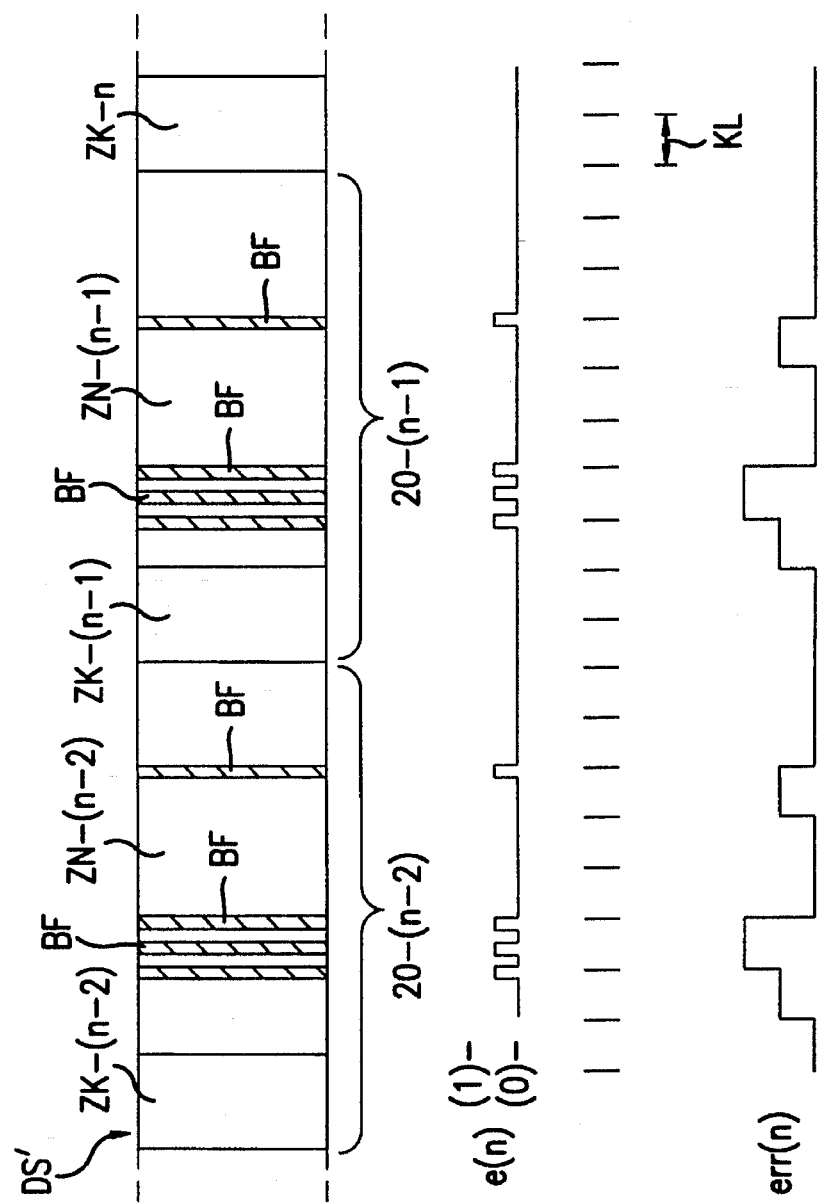
FIG. 3 illustrates an evaluation of the received test data for deriving a bit-error function or a classified bit-error function.

The first line of FIG. 3 schematically shows a portion of the; corrupted data stream DS' comprising data cells 20-(n–2) and 20-(n–1) serving as test cells of the cell-type-structured data stream DS' being received. Bit errors BF, indicated by cross hatching, are contained in the useful cell fields ZN-(n–2) and ZN-(n–1). Such bit errors can be also be contained in the corresponding cell heads ZK-(n–2) or ZK-(n–1).

In the second line of FIG. 3, a unipolar bit-error function $e(n)$ is shown, which is derived from a comparison of the received test-data cells 20-(n–2) and 20-(n–1) with the test-data cells originally output by the data source 1. For this purpose, the value zero (0) is assigned to each correctly transmitted bit, and the value one (1) to each incorrectly transmitted bit. The third line of FIG. 3 shows a class division with a specific class length (bit length) KL. In the fourth line of FIG. 3, a classified bit-error function $err(n)$ is shown. The classified bit-error function $err(n)$ is formed by combining the bit errors BF of the bit-error function $e(n)$ detected within one class length KL. The bit errors occurring within one class length KL are summed. The sum is retained throughout the class length KL.

Although FIG. 3 only shows the bit-error function $e(n)$ or the classified bit-error function $err(n)$ for two successive data cells, a plurality of data cells is actually evaluated. Preferably, a pan of the bit-error function $e(n)$ or of the classified bit-error function $err(n)$ is evaluated with a partial length, which will allow at least 100 bit errors to be contained. It has proven to be especially advantageous in a transmission system having a scrambler 6, 8 or descrambler 7, 9 (FIG. 1), when the length of the bit-error function has at least ten times, preferably one hundred times the period of the scrambler (or descrambler) instruction.

One way to generate a classified bit-error function $err(n)$ is to cross-correlate the transmitted data contained in the particular useful cell field with the known test data and to consider the bit fields that have occurred in the cell head. The maximum of the cross-correlation function decreases with an increasing number of bit errors per data cell, so that the maximum already produces a classified bit-error function, in which case, the class length corresponds to the (useful) data cell length. This way to determine the classified bit-error function is described in detail in the German Patent Application P 40 12 850.4. A determination of the bit errors occurring in the cell head can be made, for example, based on a check word contained in the cell head and derived from the content of the cell head (for example, from the first four bytes of the cell head). Such an evaluation and correction of the cell head is described, for example, in the CCITT (*Comité Consultatif International de Télégraphique et Téléphonique*)-Correction 1990, pp. 134–137.

Figure 4:
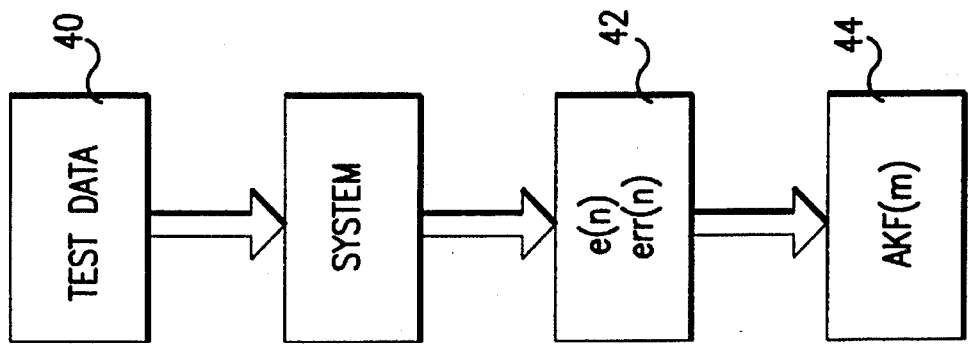
FIG. 4 is a flow diagram which illustrates the fundamental functional sequence of the process according to the present invention.

FIG. 4 is a flow diagram which shows the fundamental functional sequence of the process according to the present invention. In a first process step 40, as already clad fled in detail, test data are inserted into the data stream DS, (or make up the data stream itself). The system to be tested receives the test data, which are subject to the same interference effects as the useful data to be transmitted. From the bit errors contained in the received test data and determined from a comparison with the test data originally sent, the bit error function e(n) is determined in a second process step 42. In a third process step 44, the bit-error function e(n) or the classified bit-error function err(n) is subjected to an autocorrelation.

Figure 5:
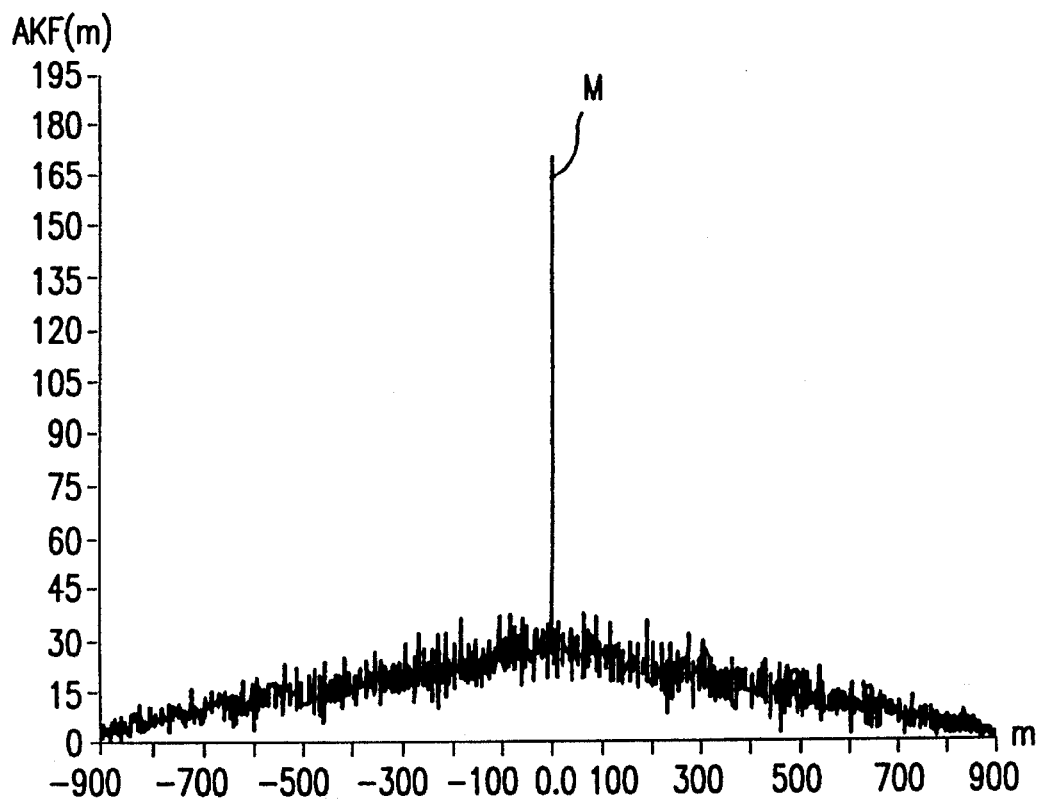
FIGS. 5 and 6 are graphs which represent the results of the process according to the present invention.
Figure 6:
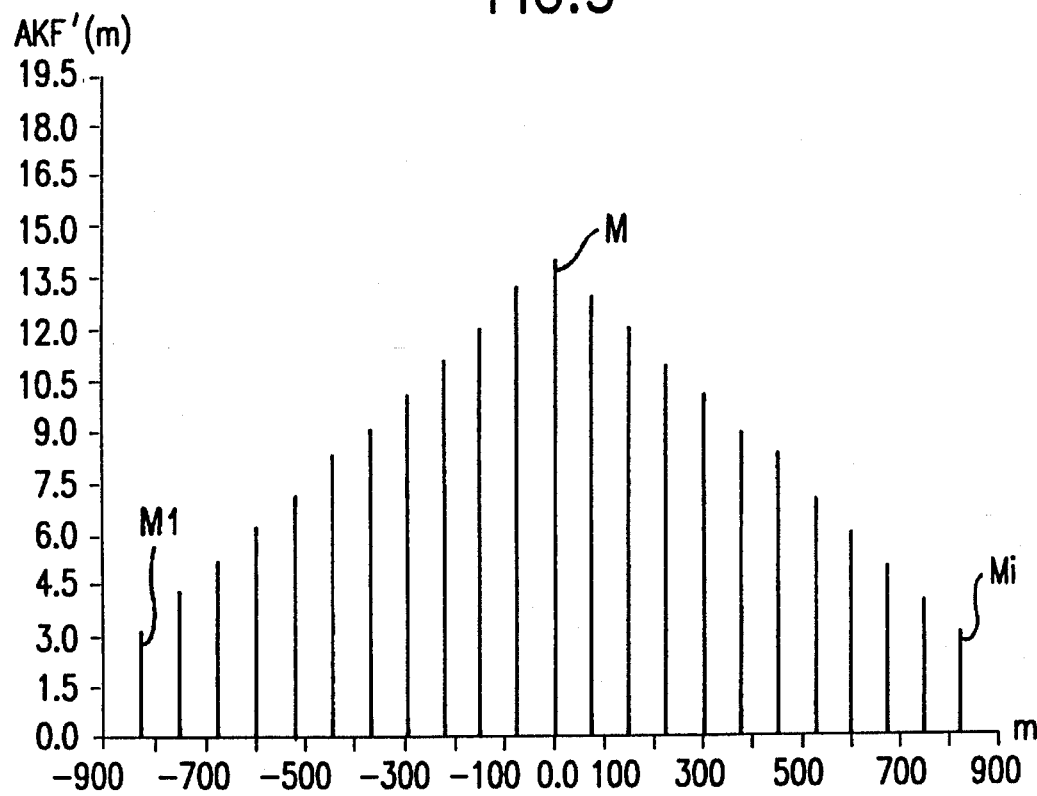

The result of the autocorrelation is shown in the form of the autocorrelation function AKF(m) in FIGS. 5 and 6. FIG. 5 depicts an autocorrelation function AKF(m) having a significant maximum M at m=0 and without other pronounced maxima. From this, the influence of a white (gaussian) noise can be inferred and, thus, a stochastic interference 10 (FIG. 1) on a transmission path. In such case, the optical or electrical transmitters or receivers, amplifiers, etc. contained in the transmission path are considered as possible causes of errors and, thus, accordingly as possible error locations, whose noise properties would then have to be checked. The level of the maximum M is a measure for the bit-error rate (bit-error number per evaluated section of the data stream) and, given a unipolar, binary bit-error function (in some instances with scaling), makes it possible for the bit-error number to be simply determined in the correlated section. In the present example, the number amounts to approximately 172, provided that the unipolar, binary bit-error function e(n) has been directly autocorrelated.

On the other hand, FIG. 6 depicts an autocorrelation function AKF'(m) having several maxima M1 . . . Mi. A main maximum M likewise lies at m=0. Bit errors can be inferred from such an equidistant distribution of the maxima, not only based on a deterministic interference, but also based on a periodic interference. To more accurately test the transmission paths, the bit-error function e(n) (or the classified bit-error function err(n)) is subjected to a Fast Fourier transformation (FFT), a Laplace transformation or a Z-transformation. As a result, the periodicity of the bit errors is exactly determined. The periodicity or the frequency then permits the cause of the deterministic interference effect to be determined and, thus, as a rule also the error location.

Figure 7:
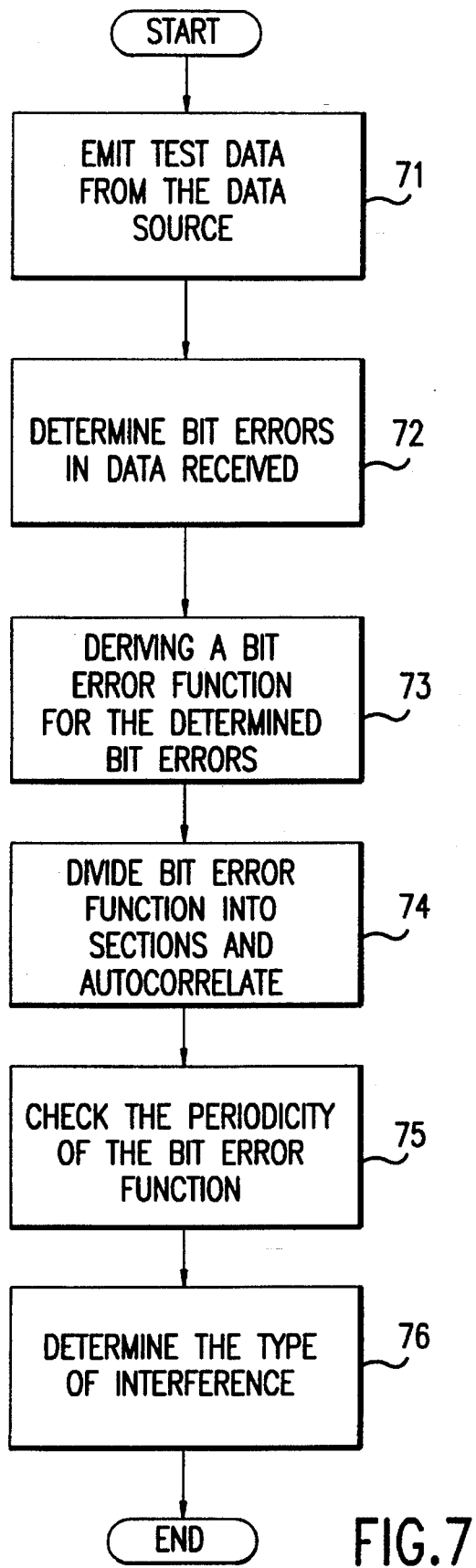
FIG. 7 is a flow diagram illustrating the steps in a process in accordance with the present invention.

FIG. 7 is a flow diagram illustrating the process in accordance with the present invention. At step 71, test data is emitted from the data source by writing test data into the data cells to create test cells. At step 72, any bit errors received by the system to be tested are then determined. At step 73, a bit error function is derived for the bit errors determined in step 72. Then, at step 74, the bit error function is divided into sections and a section-by-section autocorrelation of the bit error function is performed, thereby generating an autocorrelation function. At step 75, the periodicity of the bit-error function is checked based on the autocorrelation performed in step 74. Finally, at step 76, the type of interference is determined in accordance with the autocorrelation function obtained in step 74. Whenever the autocorrelation function obtained in step 74 exhibits a significant maximum without further pronounced maxima, the type of interference is determined to be stochastic, whereas whenever the autocorrelation function exhibits several maxima of an equidistant distribution, the interference is determined to be deterministic.

We claim:

1. In a system having a data source, providing a data stream, at least one transmission path, providing a path for transmission of the data stream, and a data receiver, receiving the data stream, a method for determining the type of a data corrupting interference, which causes bit errors in the data stream, comprising steps of:

a) emitting test data from the data source;

b) determining bit errors in data received;

c) deriving a bit error function for the bit errors determined in step (b);

d) dividing the bit error function into sections;

e) performing a section by section autocorrelation of the bit error function to obtain an autocorrelation function, a length of an autocorrelation section at any one time being rated to contain a plurality of bit errors;

f) checking the periodicity of the bit-error function based on the autocorrelation performed in step (e);

g) determining the type of interference to be stochastic whenever the autocorrelation function obtained in step (e) exhibits a significant maximum without further pronounced maxima, and determining the type of interference to be deterministic whenever the autocorrelation function obtained in step (e) exhibits several maxima of an equidistant distribution.

2. The process of claim 1 wherein the length of an autocorrelation section at any time is rated to contain at least 100 bit errors.

3. The process of claim 1 further comprising a step of combining the bit error function by sections into classes having a defined class length before the step of performing the autocorrelation.

4. The process of claim 1 further comprising the step of performing a Fourier transformation of the bit error function after the bit error function is derived in step (c).

5. The process of claim 3 further comprising the step of performing a Fourier transformation of the classified bit error function.

6. The process of claim 1 further comprising the step of performing a Laplace transformation of the bit error function after the bit error function is derived in step (c).

7. The process of claim 3 further comprising the step of performing a Laplace transformation of the classified bit error function.

8. The process of claim 1 further comprising the step of performing a Z-transformation of the bit error function after the bit error function is derived in step (c).

9. The process of claim 3 further comprising the step of performing a Z-transformation of the classified bit error function.

10. In a system having a data source, providing a data stream, the data stream including successive data cells, each data cell including a cell head and a useful cell field, a scrambler scrambling the data stream in accordance with a specified instruction by a known period length, at least one transmission path, providing a transmission path for the scrambled data stream, a descrambler, descrambling the scrambled data in accordance with an instruction corresponding to the specified instruction, and a data receiver, receiving the descrambled data stream, a method for determining the type of a data corrupting interference, which causes bit errors in the data stream, comprising steps of:

a) writing test data into the data cells at the data source to create test cells;

b) determining bit errors in data received;

c) deriving a bit error function for the bit errors determined in step (b);

d) dividing the bit error function into sections;

e) performing a section by section autocorrelation of the bit error function to obtain an autocorrelation function, a length of an autocorrelation section at any one time is selected to be at least one decade longer than the known period length;

f) checking the periodicity of the bit-error function based on the autocorrelation performed in step (e);

g) determining the type of interference to be stochastic whenever the autocorrelation function obtained in step (e) exhibits a significant maximum without further pronounced maxima, and determining the type of interference to be deterministic whenever the autocorrelation function obtained in step (e) exhibits several maxima of an equidistant distribution.

11. The process of claim 1 wherein the test data emitted from the data source also contain useful information.

12. The process of claim 10 wherein the test cells also contain useful information.

13. The process of claim 1 further comprising the step of evaluating the maxima of the autocorrelation function to determine a bit-error rate.

14. The process of claim 10 further comprising the step of evaluating the maxima of the autocorrelation function to determine a bit-error rate.

* * * * *